(12) United States Patent
Pendharkar et al.

(10) Patent No.: US 10,402,394 B2
(45) Date of Patent: Sep. 3, 2019

(54) SYSTEMS AND METHODS FOR FLUSHING DATA IN A VIRTUAL COMPUTING ENVIRONMENT

(71) Applicant: Veritas Technologies LLC, Mountain View, CA (US)

(72) Inventors: Niranjan Pendharkar, Pune (IN); Christopher Uhler, Palo Alto, CA (US); Rakesh Ranjan, Cupertino, CA (US)

(73) Assignee: Veritas Technologies LLC, Mountain View, CA (US)

( * ) Notice: Subject to any disclaimer, the term of this patent is extended or adjusted under 35 U.S.C. 154(b) by 261 days.

(21) Appl. No.: 15/392,951

(22) Filed: Dec. 28, 2016

(65) Prior Publication Data

US 2018/0121490 A1    May 3, 2018

(30) Foreign Application Priority Data

Nov. 3, 2016    (IN) .............................. 201611037610

(51) Int. Cl.
*G06F 16/00* (2019.01)
*G06F 16/23* (2019.01)
(Continued)

(52) U.S. Cl.
CPC ...... *G06F 16/2365* (2019.01); *G06F 9/45558* (2013.01); *G06F 16/215* (2019.01); *G06F 2009/45579* (2013.01)

(58) Field of Classification Search
CPC ........... G06F 17/30371; G06F 9/45558; G06F 2009/45579; G06F 3/0664; G06F 9/5077; G06F 11/1451; G06F 12/0866; G06F 2009/45583; G06F 3/06; G06F 17/30303; G06F 17/30563; G06F 17/30; G06F 9/5038; G06F 17/30286; G06F 17/30595; G06F 17/30283; G06F 17/30477; G06F 17/30575; G06F 17/30545
See application file for complete search history.

(56) References Cited

U.S. PATENT DOCUMENTS 9,985,649 B1 *    5/2018    Bassov .................. H03M 7/60
2008/0028167 A1 *    1/2008    Sharma ............... G06F 11/2082
                                                                 711/156

(Continued)

*Primary Examiner* — Anh Ly
(74) *Attorney, Agent, or Firm* — Patent Law Works LLP (57) ABSTRACT

A method for flushing data in a virtual computing environment is provided. The method includes writing application output from an application spanning one or more virtual machines to a cache, wherein each virtual machine is implemented using one or more compute nodes and the cache is implemented in storage associated with the one or more compute nodes. In an effort to flush data associated with application writes more efficiently from the cache to a local backing store or one or more data nodes, the method may include generating a mapping of each of the plurality of application writes. The method may further include sorting sets of one or more virtual disks based upon an offset of each application write as indicated in the mapping. In addition, a storage virtualizer may cancel duplicate application writes, merge multiple contiguous application writes, and merge multiple epochs prior to flushing the data.

20 Claims, 5 Drawing Sheets

(51) Int. Cl.
*G06F 9/455* (2018.01)
*G06F 16/215* (2019.01)

(56) References Cited

U.S. PATENT DOCUMENTS

| | | | | |
|---|---|---|---|---|
| 2010/0153617 | A1* | 6/2010 | Miroshnichenko | G06F 3/061 |
| | | | | 711/6 |
| 2012/0215970 | A1* | 8/2012 | Shats | G06F 12/0866 |
| | | | | 711/103 |
| 2013/0086007 | A1* | 4/2013 | Bandopadhyay | G06F 16/1748 |
| | | | | 707/692 |
| 2014/0025770 | A1* | 1/2014 | Warfield | G06F 15/17331 |
| | | | | 709/213 |
| 2014/0122818 | A1* | 5/2014 | Hayasaka | G06F 3/0641 |
| | | | | 711/162 |
| 2014/0244791 | A1* | 8/2014 | Fellows | H04L 67/06 |
| | | | | 709/217 |
| 2014/0245319 | A1* | 8/2014 | Fellows | G06F 9/5072 |
| | | | | 718/104 |
| 2015/0143064 | A1* | 5/2015 | Bhargava | G06F 11/1451 |
| | | | | 711/162 |
| 2016/0011816 | A1* | 1/2016 | Aizman | G06F 3/0604 |
| | | | | 711/117 |
| 2016/0292074 | A1* | 10/2016 | Awasthi | G06F 13/4027 |
| 2016/0366226 | A1* | 12/2016 | Friedman | G06F 16/2255 |
| 2017/0031946 | A1* | 2/2017 | Sarab | G06F 17/30156 |
| | | | | 707/E17.045 |
| 2017/0308320 | A1* | 10/2017 | Sharma | G06F 3/0605 |

\* cited by examiner

SYSTEMS AND METHODS FOR FLUSHING DATA IN A VIRTUAL COMPUTING ENVIRONMENT

BACKGROUND

Virtualized computing systems may comprise an arrangement of clustered compute nodes (servers) and data nodes for efficient, simultaneous execution of multiple applications. In particular, compute nodes, having direct or remote storage, may be used to implement virtual machines that execute various applications simultaneously. For example, an application, such as a database or a business application, can span one or more virtual machines. Networked data nodes within a data plane, including data node storage, may couple to the compute nodes, cooperating with a storage virtualizer to provide other storage options. Periodically, data can be flushed to backend data storage, which may be implemented in at least two places: either local to the compute nodes or remotely in the data plane. The virtualized computing system may include Hard Disk Drives (HDDs) and Solid State Drives (SSDs) local to the compute nodes. These drives may be organized into volumes, which contain the entire content of a virtual disk; wherein the virtual disk represents a unit of the virtualized storage associated with an application.

During execution of an application, data may be asynchronously flushed to two places. First, it may be written to the HDD and SSD, which is slower than writing to the cache. In the alternative, it may be written to the data node, which comprises longer-term storage, primarily used for analytics and various other needs. While application writes to the cache may be very fast, the application is limited by the performance of the one or more HDDs and SSDs making up the back end. Particularly, since the compute nodes generally require involvement of a processor in order to perform data flushing, performance associated with applications can be severely limited by data flushing. That is, since there is only a certain amount of cache space available, when the cache fills up, there will be a need to get rid of older data. When this older data is sent to the slower storage at the back end, the application's performance is limited by the speed of the slower storage. Ultimately, when the application pushes a large amount of writes from virtual machines to data storage, the application is limited by the speed of these backend HDDs and SSDs, rather than by the speed of the cache. Accordingly, although the storage cache unit may comprise high-performance flash drives, the slower performance of the HDDs and SSDs may impede the processing of applications during a data flush. Further since application writes are random, the writes captured in the log are also randomly distributed. This random nature of the data further impedes the performance of an application during a data flush, since flushing results in random writes to the backend HDDs, which are much faster at sequential writes than random ones. It is within this context that the embodiments arise.

SUMMARY

Embodiments of a system and method for flushing data in a virtual computing environment are provided. It should be appreciated that the present embodiment can be implemented in numerous ways, such as a process, an apparatus, a system, a device, or a method. Several inventive embodiments are described below.

In some embodiments, a method for flushing data in a virtual computing environment is provided. The method may include writing application output from an application spanning one or more virtual machines to a cache, wherein each virtual machine is implemented using one or more compute nodes and the cache is implemented in storage associated with the one or more compute nodes. In an effort to flush data associated with application writes more efficiently from the cache to one or more data nodes, the method may include generating a mapping of each of the plurality of application writes. The method may further include sorting sets of one or more virtual disks based upon an offset each application write as indicated in the mapping. In addition, a storage virtualizer may cancel duplicate application writes, merge multiple contiguous application writes, and merge multiple epochs in the background prior to flushing the data.

In some embodiments a tangible, non-transitory, computer-readable media having instructions thereupon which, when executed by a processor, cause the processor to perform a method of flushing data in a virtual computing environment. The method may include writing application output from an application spanning one or more virtual machines to a cache, wherein each virtual machine is implemented using one or more compute nodes and the cache is implemented in storage associated with the one or more compute nodes. In an effort to flush data associated with application writes more efficiently from the cache to one or more data nodes, the method may include generating a mapping of each of the plurality of application writes. The method may further include sorting sets of one or more virtual disks based upon an offset each application write as indicated in the mapping. In addition, a storage virtualizer may cancel duplicate application writes, merge multiple contiguous application writes, and merge multiple epochs prior to flushing the data.

In some embodiments, a virtual environment computing system is provided. The system includes a plurality of compute nodes coupled as a compute plane and configured to host a plurality of virtual machines executing a plurality of applications. The plurality of compute nodes include direct attached storage (DAS). The system includes a plurality of data nodes coupled as a data plane and configured as virtual storage and a controller coupled to the compute plane and the data plane, the controller including instructions to perform actions. The actions may include writing application output from an application spanning one or more virtual machines to a cache, wherein each virtual machine is implemented using one or more compute nodes and the cache is implemented in storage associated with the one or more compute nodes. The actions include generating a mapping of each of the plurality of application writes. The actions may further include sorting sets of one or more virtual disks based upon an offset each application write as indicated in the mapping. In addition, the controller may cancel duplicate application writes, merge multiple contiguous application writes, and merge multiple epochs prior to flushing the data.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The following embodiments describe a system and method for flushing data in a virtual computing environment. It can be appreciated by one skilled in the art, that the embodiments may be practiced without some or all of these specific details. In other instances, well known process operations have not been described in detail in order not to unnecessarily obscure the embodiments.

The embodiments below describe a system and method for flushing data in a virtual computing environment. The method may include writing application output from an application spanning one or more virtual machines to a cache, wherein each virtual machine is implemented using one or more compute nodes and the cache is implemented in storage associated with the one or more compute nodes. In an effort to flush data associated with application writes more efficiently from the cache to the backing store for the virtual disk on slower local physical storage media, the method may include generating a mapping of each of the plurality of application writes. The method may further include sorting sets of one or more virtual disks based upon an offset each application write as indicated in the mapping. In addition, a storage virtualizer may cancel duplicate application writes, merge multiple contiguous application writes, and merge multiple epochs prior to flushing the data. For additional efficiency, the method may include performing inline dedupe to reduce Input/Output operations per second (IOPs) prior to flushing the application writes to the data plane. Moreover, further optimization may include performing inline compress prior to flushing the data.

While the log is flushed to a backend store typically made up of HDD, the following optimizations to the flushing process ensure the effective throughput of underlying devices increase by over 150%. Typically HDD supports random 1OPS of 150-200. Accordingly, the performance of the backend storage does not to impede the performance of the storage cache, the virtual disks, or applications running thereon.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
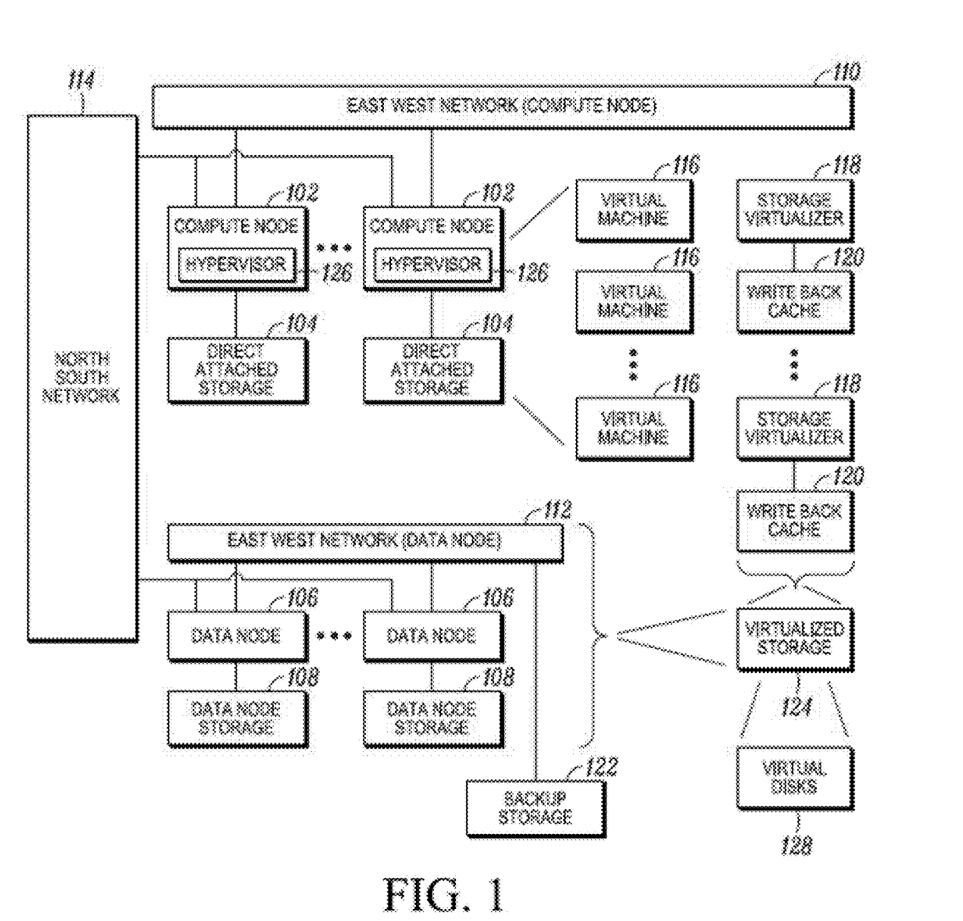
FIG. 1 is a block diagram of a computing and storage system that hosts virtual machines and one or more storage virtualizers, and performs snapshots and backups in accordance with an embodiment of the present disclosure.
Figure 2:
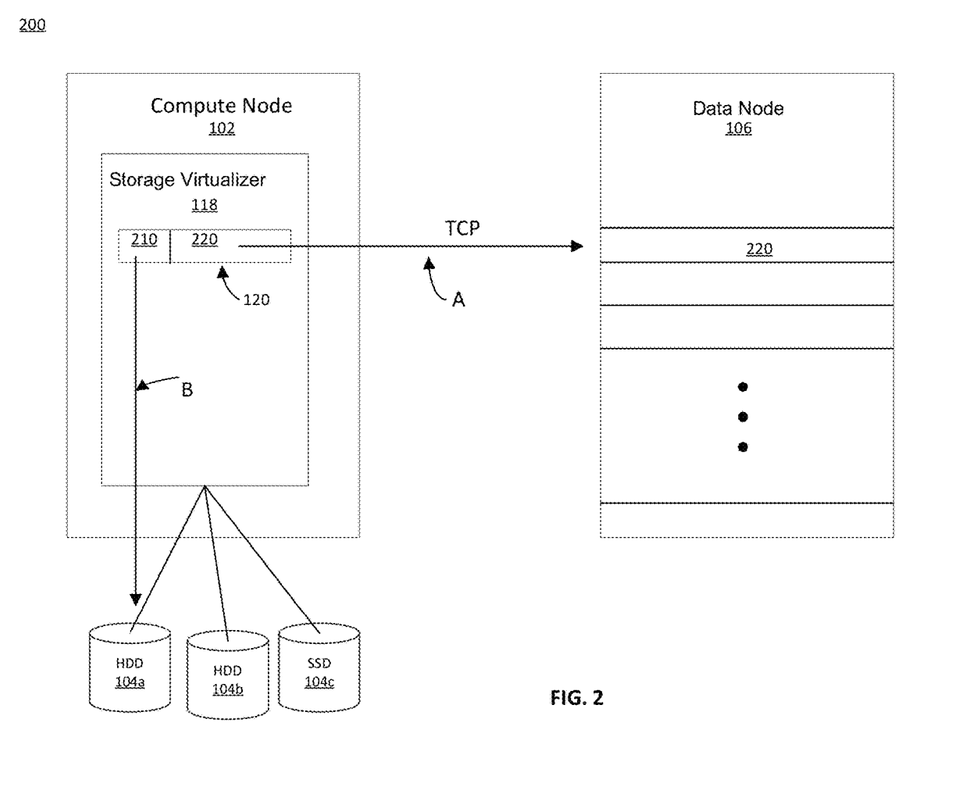
FIG. 2 is a block diagram showing the two flushing paths of application writes within the system of FIG. 1, with further details of storage nodes in the compute plane, in accordance with some embodiments.

Referring to FIG. 1, an exemplary embodiment of a computing and storage system that hosts virtual machines 116 and one or more storage virtualizers 118, and performs data flushing in accordance with an embodiment of the present disclosure is shown. Compute nodes 102, with direct attached storage 104, are coupled together by a network 110, in this example called the East-West network 110 for compute nodes. These interconnected compute nodes 102 are called a compute plane, or compute planes (depending upon how the virtual machines 116 are organized). The direct attached storage 104 of each compute node 102 is coupled to physical computing resources of that compute node (e.g., one or more processors), but is not coupled to other direct attached storages 104 of other compute nodes 102, or to other compute nodes 102 or resources outside of the compute nodes 102 except via the computing resources of the compute node 102 to which the direct attached storage 104 belongs. Data nodes 106, with data node storage 108, are coupled together by a network 112, in this example called the East-West network 112 for data nodes. These interconnected data nodes 106 are called a data plane or data planes (depending upon how virtual storage is organized). The compute nodes 102 are coupled to the data nodes 106 by a network 114, in this example called the north-south network 114. More details are shown in FIG. 2.

Continuing with FIG. 1, the compute nodes 102, with direct attached storage 104, implement virtual machines 116. For example, hypervisors 126 in compute nodes 102 could assign physical computing resources, including processing resources and local memory, to virtual machines 116. One or more applications can execute on the virtual machines 116, as will be discussed with reference to FIG. 3. For example, one virtual machine 116 could be serving a web application, other virtual machines 116 could be serving database applications, one or more virtual machines 116 could be running a business application, etc.

In some embodiments, a storage virtualizer 118 may be run as a service (daemon process) on each physical compute node. In the alternative, one of the virtual machines 116 may perform the function of a special type of storage virtualizer 118. The storage virtualizer 118 has a writeback cache 120, which is implemented in the direct attached storage 104. There can be multiple storage virtualizers 118. In some embodiments, each compute node 102 implements a storage virtualizer 118 and a portion of a virtual machine 116, or one or more virtual machines 116, executing one or more applications. The storage virtualizer(s) 118, with writeback cache(s) 120, and the networked data nodes 106, with data node storage 108, implement virtualized storage 124, e.g., in the form of virtual disks 128, for the virtual machines 116.

As will be further described with reference to FIG. 3, the virtual machines 116 write application data through the storage virtualizer 118 to the writeback cache 120. The storage virtualizer 118 manages the writeback cache 120, and transfers incremental updates of the application data to the data nodes 106 as snapshots. Backups are performed by writing from the data nodes 106 to a backup storage 122, which is coupled to the data nodes 106 by the network 112. Restores, from snapshots or backups, proceed from these resources back to the direct attached storage 104 of the compute nodes 102. Further details of the computing and storage system of FIG. 1 may be found in U.S. application Ser. No. 14/284,070, entitled DATA MANAGEMENT TIER COUPLING PRIMARY STORAGE AND SECONDARY STORAGE, filed May 21, 2014, which is incorporated herein by reference for all purposes.

In operation, when executing applications, the virtual machine 116 may write to and/or read data from some high performance cache storage 120 (application Input/Output (I/O)). Accordingly, the compute node 102 may capture data of every virtual disk in a front-end log using the cache associated with the storage virtualizer 118, where writes and overwrites may be written in the form of a log. Periodically, based upon time or data size, an epoch may be generated using an epoch marker. In particular, the storage virtualizer 118 may pause or quiet the application I/O, insert the epoch marker into the cache, and then resume the application I/O.

Prior to the log being flushed to the backend store including the one or more HDDs and SSDs, storage virtualizer 118 may generate a mapping of each of the plurality of application writes. The storage virtualizer 118 may further include sorting sets of one or more virtual disks based upon an offset each application write as indicated in the mapping. In addition, the storage virtualizer 118 may cancel duplicate application writes. During the processing of application writes, when the data are overwritten, the mapping points to the new location of the updated data. Conventional virtual computing environments typically send duplicate writes during a data flush, where the data are overwritten on the hard disk. The processing of duplicate writes can create a drag on the performance. However, the system, having the efficient data flushing mechanism described herein, provides cost savings and enhances performance of the application and virtual machines.

Further, the storage virtualizer 118 may merge multiple contiguous application writes. First, the application writes can be sorted in the table of the mapping, and based upon the sorting, the storage virtualizer 118 may detect whether a write is a contiguous write. When the data are flushed the contiguous block of data is written as one as opposed to more than one blocks being written. It is more effective to send individual large application writes than to send multiple small writes. For example, (as shown in FIG. 3), given a block A of data from offset 50 and a length of 10 bytes and a block B of offset 61 and the length of 10 bytes (stored in cache 320), the storage virtualizer 118 can determine that block A goes from 50 to 60 and block B goes from 61 to 70 that these blocks are contiguous. In response to a contiguous write, storage virtualizer 118 will concatenate blocks A and B together prior to being written on the backend data store.

In addition, the storage virtualizer 118 may merge multiple epochs prior to flushing the data, where each epoch represents one or more application writes that occur during a vdisk version. For example, the storage virtualizer 118 may detect the epoch associated with each vdisk version. The storage virtualizer 118 may request permission to send the epoch to any one of the data nodes in the data plane. In response to denial of permission from associated one or more data nodes, the storage virtualizer 118 may group the table entries associated with a predetermined set of epochs waiting to be transferred, wherein these grouped table entries can be sent at a later time. For example, where writes are taken every 30 minutes, an epoch marker can be placed in the cache. When there is a large number of writes that have occurred, the storage virtualizer 118 automatically may place a marker to generate an epoch. Once the marker is placed, the writes that follow it are called an epoch, which differs from a version. A vdisk version on the data node is a snapshot in time of the entire virtual disk content. An epoch, however, only includes the writes that occurred during a certain interval in which the version was generated. These vdisk versions on the data node may be thin provisioned snapshots in time of the virtual disk content data. Therefore, the epoch is the delta from the last version to the current or new version. The epoch also represents the unit of flushing to the backend storage. Prior to consolidating multiple epochs and sending them to the backend, the storage virtualizer 118 may first request to send an epoch to the data node. If the data node is busy, the storage virtualizer 118 can request to send one or more epochs at a later point in time, where multiple epochs are sent together. As an added advantage, when more epochs are accumulated without being able to flush them to the data plane, the compute plane can increase the effectiveness of optimizations such as duplicate suppression and write consolidation by performing them over a larger number of writes.

For additional efficiency, the storage virtualizer 118 may include performing inline dedupe to reduce Input/Output operations per second (IOPs) prior to flushing the application writes to the data plane. Instead of writing multiple copies, the storage virtualizer 118 can write only one copy as a result of performing inline dedupe. When redundant data exists in a virtual disk, the storage virtualizer 118 may write only one copy as opposed to writing two. Thereby, the system having an efficient flushing mechanism can save more capacity on the compute plane. Similarly, further optimization may include performing inline compress prior to flushing the data.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the storage virtualizer using any arrangement components necessary to perform the data flushing and other features (and functionality); and can be implemented in one or more separate or shared modules in various combinations and permutations.

FIG. 2 discloses a block diagram showing the two flushing paths of application writes within the system of FIG. 1, with further details of storage nodes in the compute plane, in accordance with some embodiments. As shown, compute node 102 includes a storage virtualizer 118 having a cache 120. There are two possible paths for data flushing to backend storage. The first path A is from compute node 102 to one or more data nodes 106. The second path B extends from the cache 120 to one or more of the directly attached data storage devices 104a-104c. As shown, the first two backend storage devices 104a and 104b, are HDD devices, while the other device 104c is an SSD device. Although only two HDDs and SSD are illustrated, the backend storage may be implemented using any type of storage device. During execution of the application, data may be asynchronously flushed along the two paths: A and B. First, it may be written to the HDD or SSD, which is slower. In the alternative, it may be written to the data node, which comprises longer-term storage, primarily used for analytics and various other needs.

Figure 3:
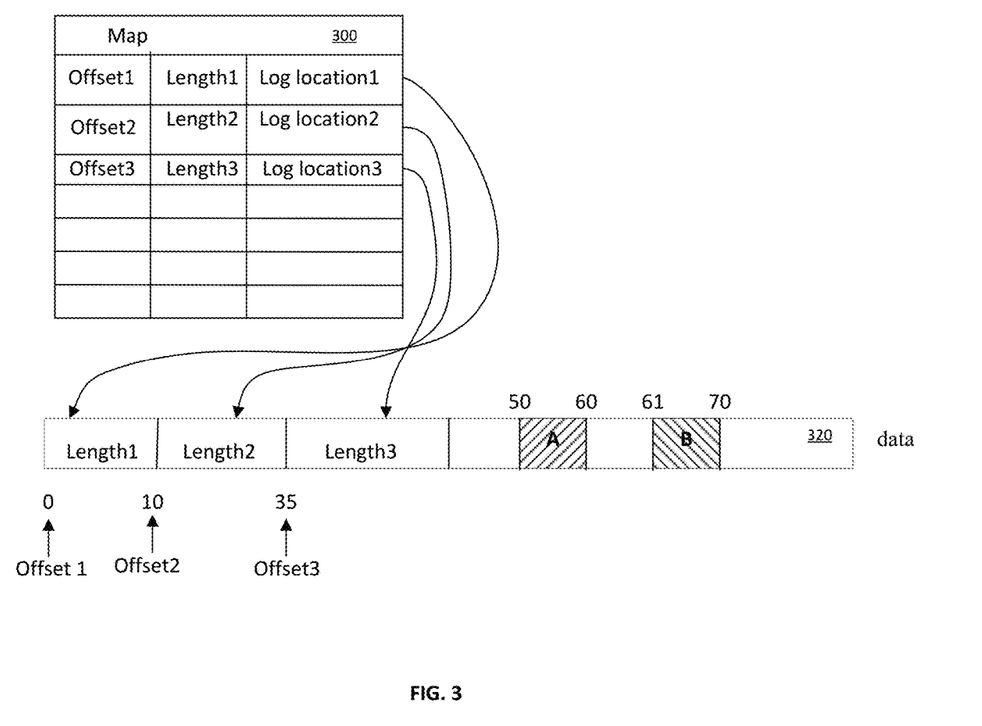
FIG. 3 is a mapping associated with application writes being stored in a storage virtualizer or other storage unit in some embodiments.

FIG. 3 illustrates an exemplary mapping 300 associated with application writes being stored in a storage virtualizer or other storage unit in some embodiments. In an effort to sort the application writes within an epoch, the order of the application writes are sorted based upon offset. A mapping 300 of the write applications is kept during multiple writes. The map provides an up-to-date location for each portion of data that is written. When the data are flushed, the storage virtualizer 118 sends the latest version of data by referencing the mapping 300 to make that determination first. That is, the mapping 300 always points to the current data blocks. Other prior application writes are effectively canceled since each write is replaced by the updated data. Mapping 300 may reside in the storage virtualizer 118 or, in the alternative, in the cache 124. The mapping 300 may also be kept in the backend storage 104 coupled to the compute node 102. As shown, in the example provided for a mapping 300, three application writes have been performed and registered in mapping 300. These application writes can be stored in cache 320, where each application write may be defined by the offset in the virtual disk and the length of the amount of data in the number of bytes that are being written. Additionally, each application write may have an associated log location from the critical block. For example, as shown, the three application writes include offsets (Offset1-3), data lengths (length1-3) and log locations (Log location1-3). The offsets (Offset1-3) are the starting offsets in the virtual disk block device of the writes. The lengths (length1-3) are the size of the writes, which is the same for the virtual disk and the cache. The log locations (Log location1-3) are the offsets in the cache, where the data have been temporarily stored. Sorting is done on offsets (Offset1-3) in order to put overwrites and contiguous writes next to each other for easy merging, and in order to make writes to the backing store sequential, and thus as fast as possible. As part of the method to deliver an efficient data flush, I/O request can be sent to the hard disk in an order from lowest to highest offset on the disk. One advantage of flushing writes to the backend storage in sorted order by increasing offset is that it is faster to write sequentially to spinning disks than to write randomly. Accordingly, the data in the cache 320 does not get changed. In some embodiments, only the associated data of the table entries with map 330 is sorted, where a write is performed in a sequential manner to the backend datastore afterwards. In some embodiments, buffers can be filled, based upon these sorted tables entries of the mapping 300. When the data is overwritten, the map 330 is reflective of the same. Therefore, the sorted mapping 300 can provide a means for sequentially writing the most current data to the backend, where any previous write may be discarded.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 4:
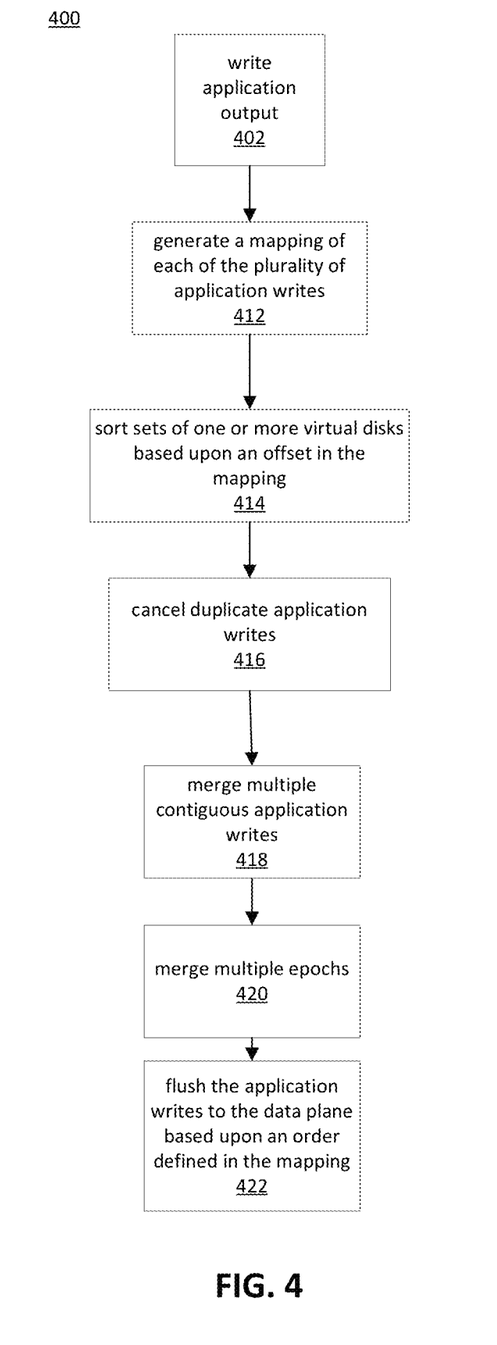
FIG. 4 is flow diagram of a method for flushing data in a virtual computing environment, which can be practiced on the system of FIGS. 1-3 and variations thereof.

FIG. 4 is an exemplary flow diagram of a method for flushing data in a virtual computing environment, which can be practiced on the system of FIGS. 1-3 in accordance with some embodiments. In an action 402, any virtual machine may write application output to cache. For example, an application can span one or more virtual machines as an application consistency group and applications writes may be sent to the cache. The one or more virtual machines may be implemented using one or more compute nodes and the cache may be implemented in storage in the one or more compute nodes.

In an action 412, a mapping of each of the plurality of application writes may be generated. For example, the storage virtualizer may identify the offset in the virtual disk of the data associated with at least one application write. The storage virtualizer may also detect the length of the amount of data in the number of bytes that are being written. Additionally, each application write may have an associated log location from the critical block which is detected by the storage virtualizer. All three of these variables relating to each application write may be stored in a table or database. Although the particular example provided includes only three variables related to the application writes, the mapping may comprise of other similar parameters associated with the application writes.

In an action 414, the storage virtualizer may merge multiple epochs, wherein each epoch represents one or more application writes that occur during a vdisk version. For example, the storage virtualizer may detect the epoch associated with each vdisk version. The storage virtualizer may request permission to send the epoch to the data plane. In response to denial of permission from associated one or more data nodes, the storage virtualizer may group the table entries associated with a predetermined set of epochs waiting to be transferred, wherein these grouped table entries can be sent at a later time and more effectively optimized as a group. The merging multiple epochs 414 may be performed before the sorting step 416, so that duplicate cancellation and merging of writes can be performed over a large span of application writes.

In an action 416, the storage virtualizer may sort sets of one or more vdisks based upon an offset in the mapping. For example, the storage virtualizer may sort each entry in the table based upon the offsets associated with each application write.

In an action 418, the storage virtualizer may cancel duplicate application writes. For example, the storage virtualizer may detect duplicate application writes, while maintaining the latest application write. The storage virtualizer may then remove any table entries associated with duplicate application writes from the table.

In an action 420, the storage virtualizer may merge multiple contiguous application writes. For example, the storage virtualizer may detect a contiguous write based upon the offset and length associated with one or more application writes. The storage virtualizer may move one of the table entries associated with the contiguous write, such that one or more application writes are adjacent to one another in a sequential order. Thereby, when the data is flushed a contiguous block of data is written as opposed to more than one blocks being written.

In an action 422, the storage virtualizer may flush the application writes to a backend storage unit based upon an order defined in the mapping. Further, the storage virtualizer may perform an inline dedupe to reduce Input/Output operations per second (IOPs) prior to the flushing of application writes to the backend datastore. The storage virtualizer may also perform an inline compress prior to the flushing of application writes to the backend datastore.

Figure 5:
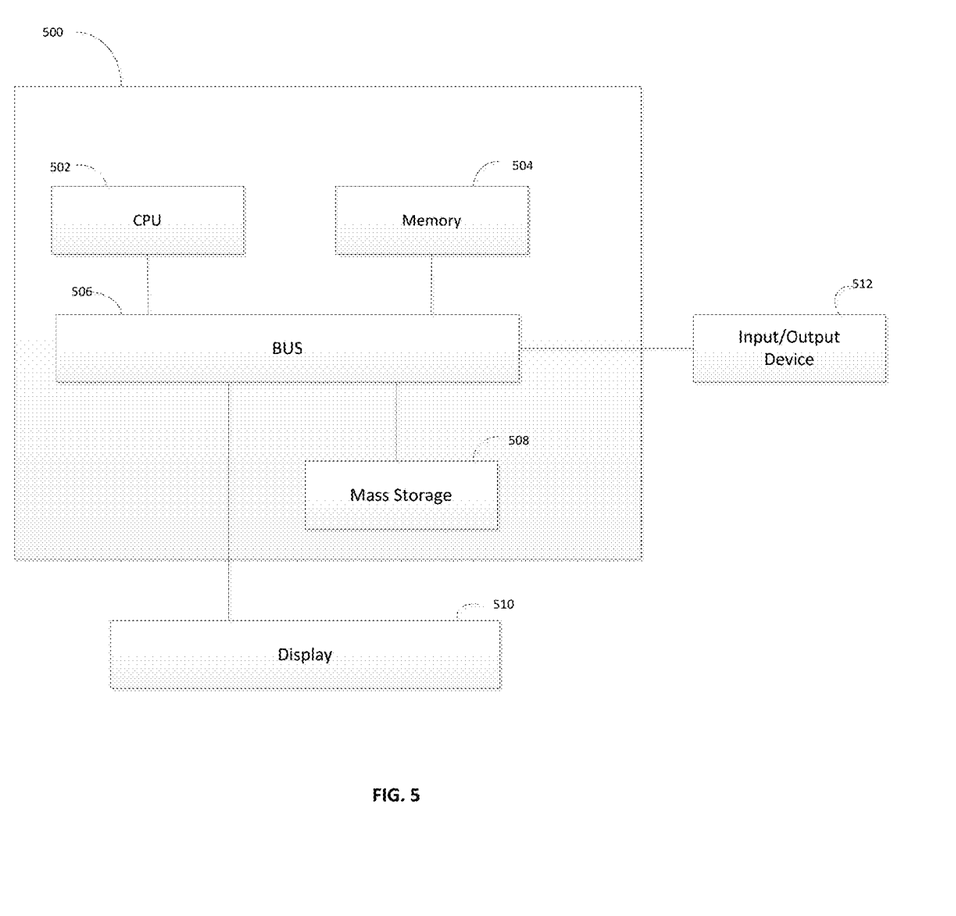
FIG. 5 is an illustration showing a computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for performing flushing of data in the virtual computing environment in accordance with some embodiments. The computing device includes a central processing unit (CPU) 502, which is coupled through a bus 506 to a memory 504, and mass storage device 508. Mass storage device 508 represents a persistent data storage device such as a spinning disk drive or solid state storage device, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1-4. The code embodying this functionality may be stored within memory 504 or mass storage device 508 for execution by a processor such as CPU 502 in some embodiments. The operating system on the computing device may be iOS™, MS-WINDOWS™, OS/2™, UNIX™, LINUX™, or other known operating systems. It should be appreciated that the embodiments described herein may be integrated with a virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of flushing data in a virtual computing environment, comprising:
   writing application output from an application spanning one or more virtual machines as an application consistency group to a cache, wherein the one or more virtual machines are implemented using one or more compute nodes and wherein the cache is implemented in storage in the one or more compute nodes;
   generating a mapping of each of the plurality of application writes to the cache;
   sorting sets of one or more virtual disks (vdisks) based upon an offset in the mapping;
   canceling duplicate application writes;
   merging multiple contiguous application writes;
   merging multiple epochs, wherein each epoch represents one or more application writes that occur during a vdisk version;
   performing an inline compress prior to flushing of the one or more application writes; and
   flushing the application writes to a backend datastore based upon an order defined in the mapping.

2. The method of claim 1, wherein the generating of the mapping comprising:
   identifying the offset of the data associated with at least one application write;
   detecting a length of the data;
   detecting a log location of the data; and
   storing the offset, the length, and the log location in a table located in the cache or a storage virtualizer implemented using a virtual machine.

3. The method of claim 1, wherein the sorting of the one or more virtual disks comprising:
   sorting each entry in the table based upon the offset associated with each application write.

4. The method of claim 1, wherein the canceling duplicate writes comprising:
   detecting duplicate application writes;
   maintaining a latest application write; and
   removing table entries associated with duplicate application writes from the table.

5. The method of claim 1, wherein the merging multiple contiguous writes comprising:
   detecting a contiguous write based upon the offset and length associated with one or more application writes; and
   moving one of the table entries associated with the contiguous write such that one or more application writes are adjacent to one another in a sequential order.

6. The method of claim 1, wherein the merging multiple epochs comprising:
   detecting the epoch associated with each vdisk version;
   requesting permission to send the epoch to the data plane; and
   grouping, in response to denial of permission, the table entries associated with a predetermined set of epochs waiting to be transferred.

7. The method of claim 1, further comprising:
   performing inline dedupe to reduce Input/Output operations per second (IOPs) prior to the flushing of application writes to the backend datastore.

8. A virtual environment computing system, comprising:
   a plurality of compute nodes coupled as a compute plane and configured to host a plurality of virtual machines executing a plurality of applications;
   the plurality of compute nodes having direct attached storage (DAS);
   a plurality of data nodes coupled as a data plane and configured as virtual storage; and
   a controller coupled to the compute plane and the data plane, the controller including instructions to perform actions comprising:
      writing application output of an application spanning one or more virtual machines as an application consistency group to a cache, wherein the one or more virtual machines are implemented using one or more compute nodes and wherein the cache is implemented in storage in the one or more compute nodes;
      generating a mapping of each of the plurality of application writes to the cache;
      sorting sets of one or more vdisks based upon an offset in the mapping;
      canceling duplicate application writes;
      merging multiple contiguous application writes;
      merging multiple epochs, wherein each epoch represents one or more application writes that occur during a vdisk version;
      performing an inline compress prior to flushing the application writes; and
      flushing the application writes to a backend datastore based upon an order defined in the mapping.

9. The virtual environment computing system of claim 8, wherein the controller, for generating the mapping, including instructions for:
   identifying the offset of the data associated with at least one application writes;
   detecting a length of the data;
   detecting a log location of the data; and
   storing the offset, the length, and the log location in a table located in the cache or a storage virtualizer implemented using a virtual machine.

10. The virtual environment computing system of claim 8, wherein the controller, for sorting the one or more virtual disks, including instructions for:
    sorting each entry in the table based upon the offset associated with each application write.

11. The virtual environment computing system of claim 8, wherein the controller, for canceling duplicate writes, including instructions for:
    detecting duplicate application writes;
    maintaining a latest application write; and
    removing table entries associated with duplicate application writes from the table.

12. The virtual environment computing system of claim 8, wherein the controller, for merging multiple contiguous writes, including instructions for:
    detecting a contiguous write based upon the offset and length associated with one or more application writes; and
    moving one of the table entries associated with the contiguous write such that one or more application writes are adjacent to one another in a sequential order.

13. The virtual environment computing system of claim 8, wherein the controller, for merging multiple epochs, including instructions for:

detecting the epoch associated with each version;
requesting permission to send the epoch to the data plane; and
grouping, in response to denial of permission, the table entries associated with a predetermined set of epochs waiting to be transferred.

14. The virtual environment computing system of claim 8, wherein the controller further including instructions for:
performing inline dedupe to reduce Input/Output operations per second (IOPs) prior to the flushing of the application writes.

15. A non-transitory computer-readable medium including code for performing a method for flushing data, the method comprising:
writing application output from an application spanning one or more virtual machines as an application consistency group to a cache, wherein the one or more virtual machines are implemented using one or more compute nodes and wherein the cache is implemented in storage in the one or more compute nodes;
generating a mapping of each of the plurality of application writes to the cache;
sorting sets of one or more virtual disks (vdisks) based upon an offset in the mapping;
canceling duplicate application writes;
merging multiple contiguous application writes;
merging multiple epochs, wherein each epoch represents one or more application writes that occur during a vdisk version;
performing an inline compress of the one or more application writes prior to flushing; and
flushing the application writes to a backend storage unit based upon an order defined in the mapping.

16. The computer-readable medium of claim 15, wherein the generating of the mapping comprising:
identifying the offset of the data associated with at least one application writes;
detecting a length of the data;
detecting a log location of the data; and
storing the offset, the length, and the log location in a table located in the cache or a storage virtualizer implemented using a virtual machine.

17. The computer-readable medium of claim 15, wherein the sorting of the one or more virtual disks comprising:
sorting each entry in the table based upon the offsets associated with each application write.

18. The computer-readable medium of claim 15, wherein the canceling duplicate writes comprising:
detecting duplicate application writes;
maintaining a latest application write; and
removing table entries associated with duplicate application writes from the table.

19. The computer-readable medium of claim 15, wherein the merging multiple contiguous writes comprising;
detecting a contiguous write based upon the offset and length associated with one or more application writes; and
moving one of the table entries associated with the contiguous write such that one or more application writes are adjacent to one another in a sequential order.

20. The computer-readable medium of claim 15, wherein the merging multiple epochs comprising:
detecting the epoch associated with each version;
requesting permission to send the epoch to the data plane; and
grouping, in response to denial of permission, the table entries associated with a predetermined set of epochs waiting to be transferred.

* * * * *